United States Patent [19]
Denber

[11] Patent Number: 5,825,916
[45] Date of Patent: Oct. 20, 1998

[54] ILLUMINANT COLOR DETECTION

[75] Inventor: Michel Denber, Rochester, N.Y.

[73] Assignee: Eastman Kodak Company, Rochester, N.Y.

[21] Appl. No.: 766,135

[22] Filed: Dec. 17, 1996

[51] Int. Cl.$^6$ .................................................. G06K 9/00
[52] U.S. Cl. ........................ 382/162; 382/197; 382/264
[58] Field of Search ................................... 382/162, 197, 382/264, 265, 288

[56] References Cited

U.S. PATENT DOCUMENTS

| 4,685,071 | 8/1987 | Lee ........................................... 364/526 |
| 5,131,058 | 7/1992 | Ting et al. ............................... 382/162 |
| 5,416,890 | 5/1995 | Baretta ..................................... 395/131 |
| 5,680,327 | 10/1997 | Cook et al. ............................. 382/162 |

*Primary Examiner*—Phuoc Tran
*Attorney, Agent, or Firm*—Peyton C. Watkins

[57] ABSTRACT

A method for determining the color of an illuminant of a scene includes the steps of: forming a color digital image of the scene; forming a chromaticity bitmap of the digital image; smoothing the chromaticity bitmap; identifying a plurality of spokes in the smoothed chromaticity bitmap and projecting a plurality of beams across the smoothed chromaticity bitmap, each beam encompassing one of the spokes; identifying the intersection of the area occupied by the beams; and determining the central tendency of the intersection to determine the color of the illuminant.

6 Claims, 6 Drawing Sheets

Microfiche Appendix Included
(1 Microfiche, 21 Pages)

ILLUMINANT COLOR DETECTION

MICROFICHE APPENDIX

Reference is made to a microfiche appendix which forms part of this specification which includes one sheet of microfiche containing twenty one frames.

FIELD OF THE INVENTION

The invention relates generally to the field of digital image processing, and in particular to a method for determining the color of the illuminant of a scene.

BACKGROUND OF THE INVENTION

The disclosure in the microfiche appendix of this patent document contains material to which a claim of copyright protection is made. The copyright owner has no objection to the facsimile reproduction of any one of the patent documents or the patent disclosure, as it appears in the U.S. Patent and Trademark Office patent file or records, but reserves all other rights whatsoever.

In most automated color image reproduction systems such as a color photographic system, electronic color image sensing a display system, the color balance of the reproduced image is automatically corrected based upon measurements performed on the original color image (e.g. a color negative in the case of color photography or a recorded digital color image in the case of electronic color image systems). In general the aim of the color correction is to cause the overall average color of the reproduced image to be a shade near gray (the Evans "gray world" hypothesis in color photographic printing). The particular shade near gray toward which the image is adjusted is called the "aim point" of the color correction process. Since the location of the aim point in color space is a strong function of the color of the light that was used to illuminate the scene in the image (the scene illuminant), knowledge of the color of the scene illuminant enables a more accurate color correction to be made, thereby improving the appearance of the reproduced image, and for photographic printing, reducing the number of remakes required.

One approach to identifying the color of the scene illuminant is described in U.S. Pat. No. 4,685,071 issued Aug. 4, 1987 to H. C. Lee, entitled method for determining the color of a scene illuminant from a color image. In the method described by Lee, the color of specularly reflected light is determined by detecting a plurality of sets of points having constant hue and varying saturation on a plurality of differently colored surfaces in the scene, and determining the locus of intersection of straight lines fit through the color values of the set of points. Although the method described by Lee produces generally satisfactory results, depending on the shape of the set of points the straight lines fit through the color values of the set of points may result in an intersection that does not correctly represent the color of the scene illuminant.

Consequently, there is a need for an improved method of determining the color of a scene illuminant from a color image.

SUMMARY OF THE INVENTION

The present invention is directed to overcoming one or more of the problems set forth above. Briefly summarized, according to one aspect of the present invention, the invention resides in a method for determining the color of an illuminant of a scene including the steps of: forming a digital image of the scene; forming a chromaticity bitmap of the digital image; smoothing the chromaticity bitmap; identifying a plurality of spokes in the smoothed chromaticity bitmap and projecting a plurality of beams across the smoothed chromaticity bitmap, each beam encompassing one of the spokes; identifying the intersection of the beams; and determining the central tendency of the intersection to determine the color of the illuminant.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
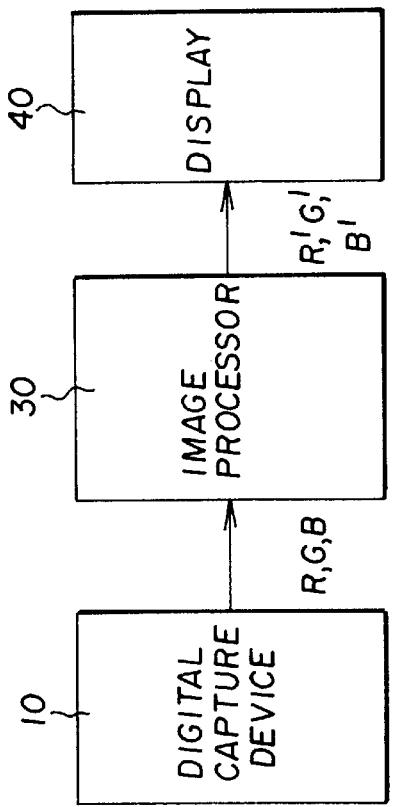
FIG. 1 is a schematic diagram of a digital image capture, processing and display system useful with the present invention.
Figure 1:
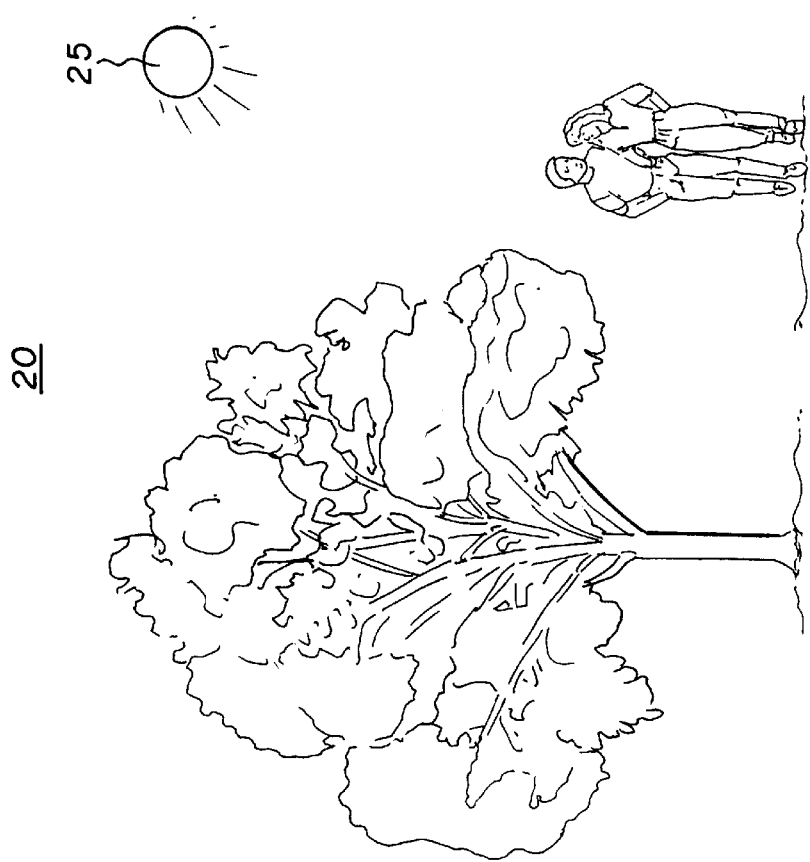

The present invention of determining the color of the illuminant of a scene may be applied widely to any of a variety of electronic systems that process color images. For example, the invention may be embodied as part of a system as illustrated in FIG. 1, which demonstrates a system in which a digital image capture device 10 captures an image of a real-world scene 20 that is illuminated by a light source or illuminant 25. Preferably, the image is captured as a color multiple bit per pixel image, such as in red, green and blue, although any suitable color format may be used. The digital representation of the image is subsequently input into an image processor 30 for performing image processing thereon. The digital representation is then sent, for example in red, green and blue, to a color display device 40, such a CRT, for displaying the processed image to the user. In processing the image, the image processor 30 determines the color of the illuminant for permitting accurate processing of the image.

Figure 2:
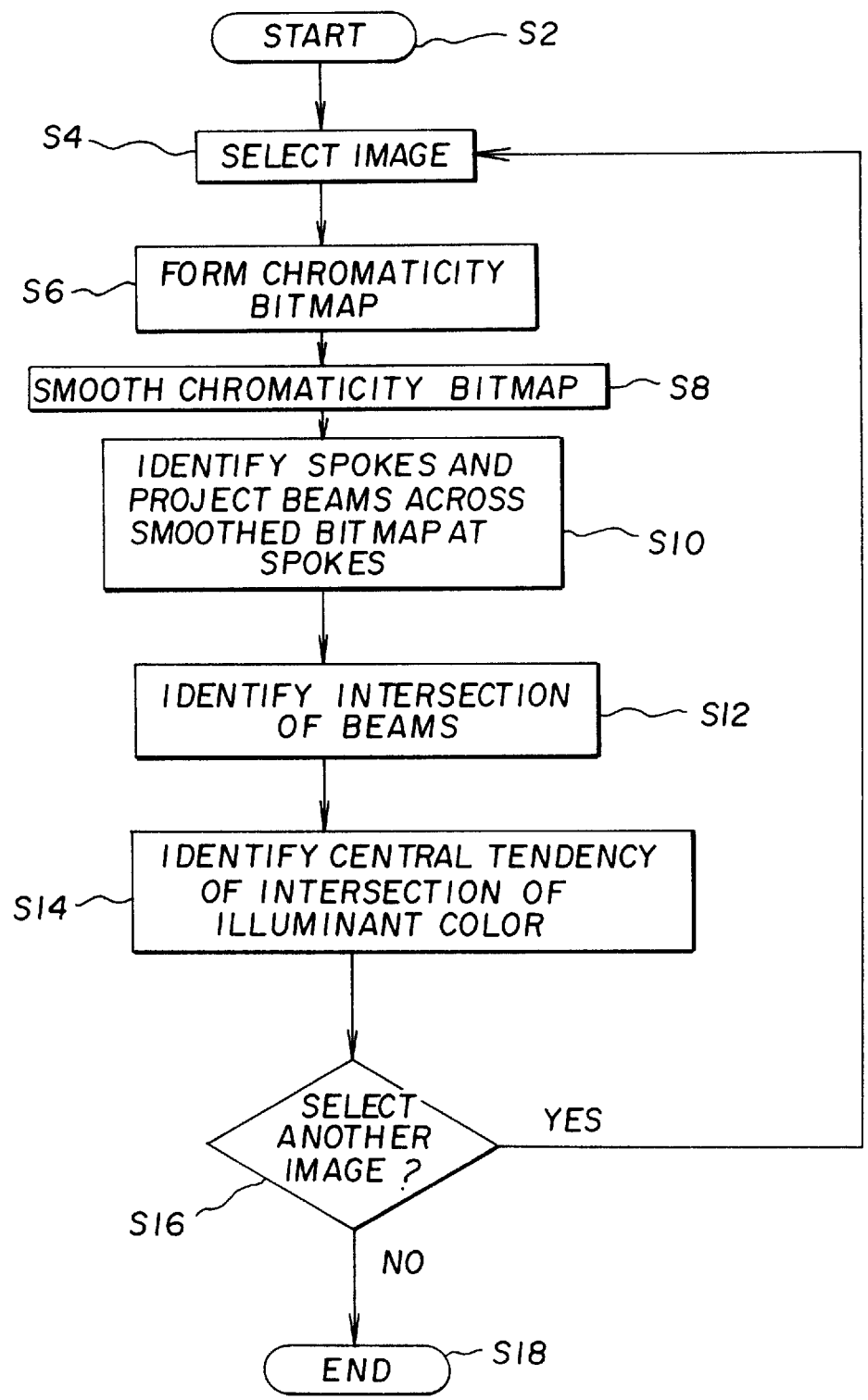
FIG. 2 is a flow chart illustrating the method of the present invention.
Figure 3:
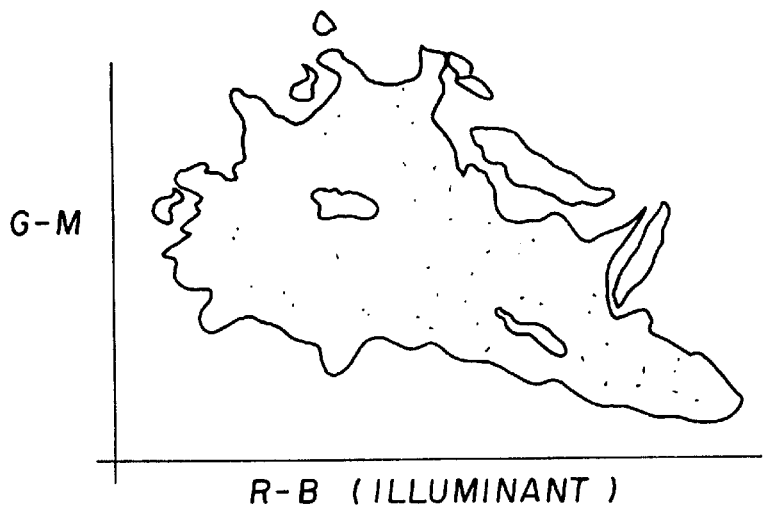
FIG. 3 is a typical chromaticity diagram or bitmap in T-space used in the present invention.

Referring to FIG. 2, there is illustrated a flowchart of the process of determining the color of the illuminant which is implemented via software in the image processor. It is instructive to note that the software is input into the image processor either via a floppy disk or it may be stored on a hard disk or firmware of the image processor. First, the software is initiated S2 and the user selects a digital representation of an image for retrieval S4 which, as previously stated, is preferably a color digital image stored in a multiple bit-per-pixel bitmap using three primary colors: red, green, and blue. A single bit-per-pixel chromaticity bitmap is then formed S6 in T-space from the retrieved image by computing the chromaticity of every pixel in the image and placing a "1" bit in the chromaticity bitmap at the position corresponding to the chromaticity of each pixel in T-space; a typical bitmap is illustrated in FIG. 3. As is well known in the art, a "0" bit is placed at each pixel in the chromaticity bitmap where there is no corresponding chromaticity in the retrieved image. The bitmap is formed as follows:

$$x=(R-B)/sqrt(2)$$

$$y=(R+G+B)/sqrt(3)$$

computed for each pixel in the retrieved image, where the x direction represents the red-blue or illuminant axis and the y direction represents the green-magenta axis.

Figure 4:
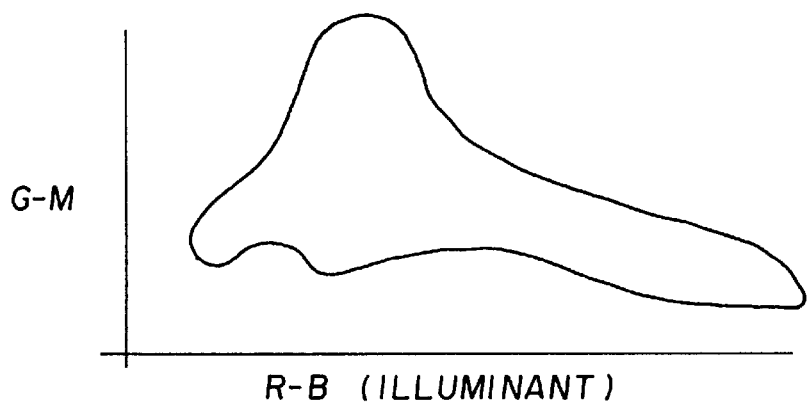
FIG. 4 is a smoothed and thresholded chromaticity diagram in T-space of FIG. 3.

A smoothed version of the chromaticity bitmap is then formed S8; a smoothed bitmap of FIG. 3 is shown in FIG. 4. Smoothing may be performed by any of a number of well-known techniques. For example, the chromaticity bitmap may be converted to a grayscale bitmap and, for each pixel in it, its value is replaced by the sum of the neighboring pixels at a distance of 3 in every direction (left, right, up, down) divided by 49, thereby blurring the image. A fixed threshold value is then applied to the resulting pixels, such that all those pixels above threshold are set to 1 and all those below are set to 0. The blur-threshold process may be repeated until the desired smoothness is attained. It is instructive to note that the smoothed bitmap includes objects thereon, one of which is typically significantly larger in size than the other objects. The large object (significant object) is used in determining the chromaticity of the illuminant as discussed in detail below.

Figure 5:
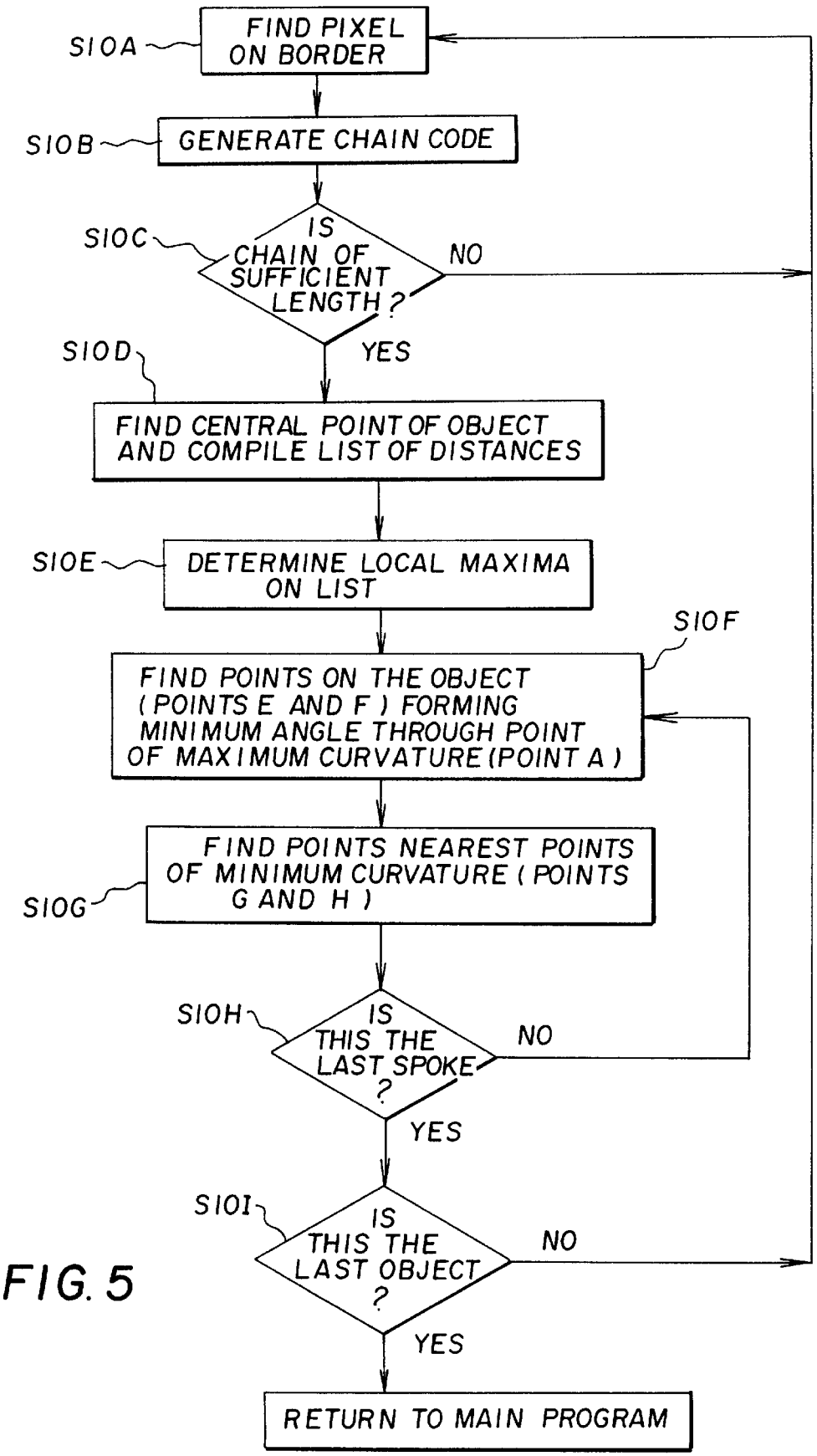
FIG. 5 is a flowchart illustrating a subroutine of FIG. 2 used for identifying spokes and projecting beams according to the present invention.

A subroutine S10 is then performed for identifying a plurality of "spokes" in the smoothed chromaticity bitmap and for, thereafter, projecting a series of "beams" across the bitmap at the spoke positions. This subroutine is illustrated by the flowchart of FIG. 5. In this regard, the chromaticity bitmap is scanned raster-fashion (line by line, preferably starting at the lower-left corner) until a non-zero pixel is encountered S10A for finding an object thereon. A chaincode representation of the object of which this pixel (i.e., initially identified pixel) is a part is then created S10B for the identified object. The generation of a chaincode is a process well-known in the art; however, it will be briefly described herein for clarity.

Figure 6:
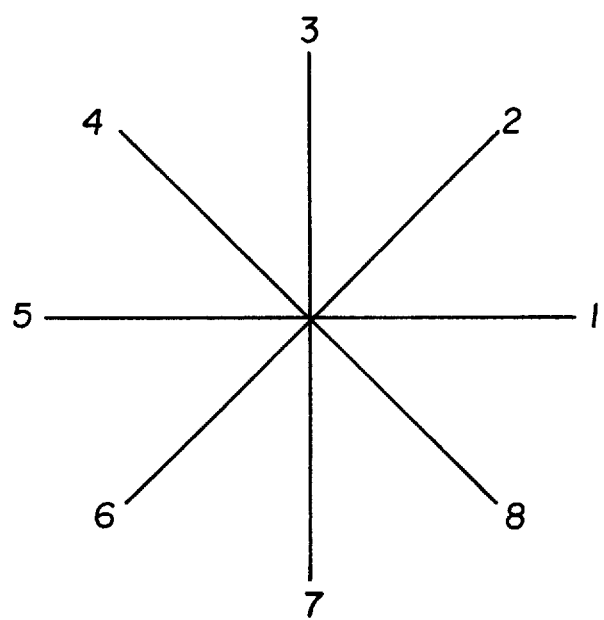
FIG. 6 is diagram illustrating typical codes assigned in creating a chaincode.

Referring briefly to FIG. 6, the pixels surrounding the initially identified pixel are sequentially searched until another non-zero pixel is encountered, and a directional digit is assigned for indicating the direction of this recently found pixel from the initially identified pixel which was found. For example, if the recently found pixel is substantially 45 degrees from the original pixel, a "2" is assigned as a directional digit, and if the recently found pixel is substantially 90 degrees from the original pixel, a "3" is assigned as a directional digit. The generation of the chaincode is continued by using the pixel which was immediately assigned a directional digit as the reference location for beginning the search and the above-described process is repeated until the original pixel is found which indicates the entire object is now in chaincode form.

Referring back to FIG. 5, when the entire object has been searched, the length of the chaincode is then checked S10C to verify that the object described is of sufficient size to be considered significant, preferably 100 pixels in length. If not, the raster-fashion search is continued beginning at the pixel on the object with highest vertical position for finding the next object, and the above-described process is repeated.

Figure 7:
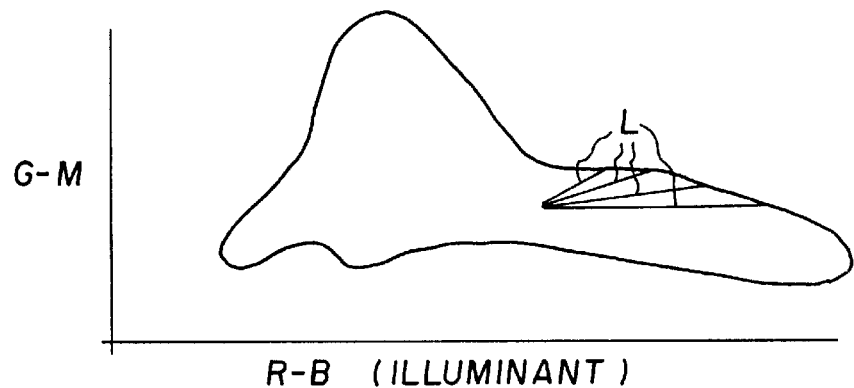
FIG. 7 is the chromaticity diagram of FIG. 4 illustrating the creation of a distance list from a chromaticity diagram.

Once a significant object has been identified, a point near its center, or preferably at its center, is established S10D by computing the average of the minimum and maximum points on the object in the x- and y- directions, assuming a hypothetical Cartesian coordinate system is used. This "central point" is used to compute a "distance list" by measuring the distance (L) between it and every point along the perimeter of the object as characterized by its chaincode, as illustrated in FIG. 7.

Figure 8:
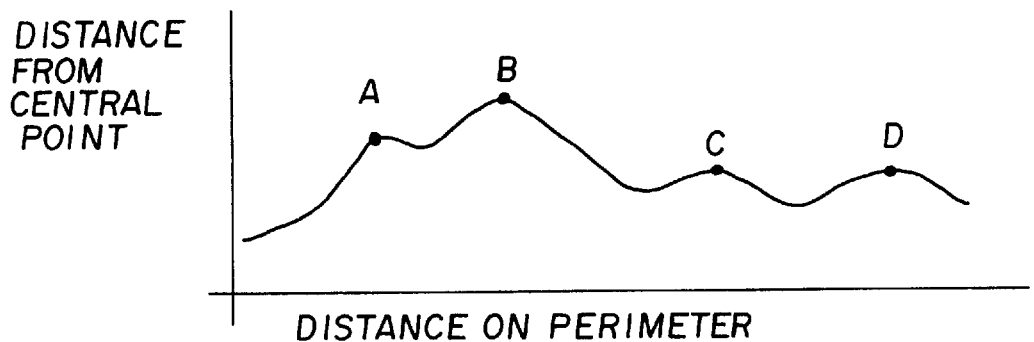
FIG. 8 is a graph illustrating the distance list of FIG. 7.

Referring to FIG. 8, a graphical representation of a typical distance list is illustrated in which the initially identified pixel on the perimeter of the object is assigned a zero on the abscissa and the adjacent pixels as sequentially located in the chaincode are, correspondingly, sequentially numbered thereafter. The ordinate is the distance of the pixel from the central point. Alternatively, for greater accuracy, four points, located in the corners of the rectangular box bounding the object may be used in lieu of the single central point, each corner as a reference point for measuring the distance to each pixel on the object. The graphs created from each reference corner are then merged, as is well known in the art, for creating a single graph. This method, however, increases computational time.

Next, each local maximum (A, B, C and D) from the distance list is identified S10E. This may be done using a number of different search techniques known in the art. For example, the graphical representation of the distance the list, which is a monotonic curve, is traversed starting preferably at the left end and the slope is computed at each point. The curve is traversed as long as the slope is positive. When the slope changes sign, that point is saved as a potential local maximum. To determine its significance, the difference between it and a second point at a fixed distance back along the curve, preferably 20 pixels leftwardly on the curve, is computed. If this difference is greater then zero, the potential maximum point is considered acceptable as a "spoke" and is saved into memory on a list of local maxima. This process is repeated for the entire distance list curve for finding each maximum or "spoke."

It is instructive to note that the local maxima (A, B, C and D) on the graph correspond to the points of maximum curvature on the perimeter of the current object in the smoothed chromaticity bitmap and therefore also represent the endpoints of the spokes in the object. Once they have been found, the beam boundaries may be computed. This process is illustrated in FIG. 9.

Figure 9:
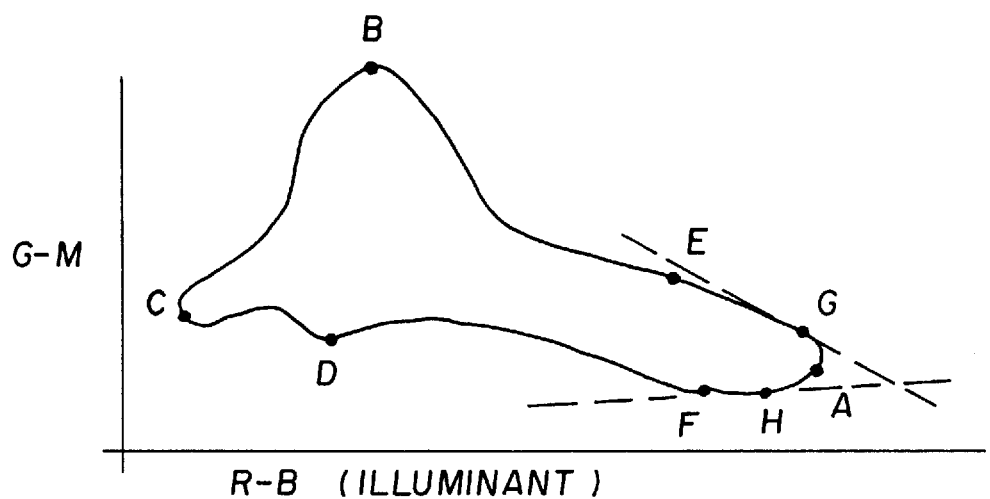
FIG. 9 is the chromaticity diagram of FIG. 4 illustrating the projection of beams over the spokes.

Referring to FIGS. 5 and 9, first, for each spoke endpoint, two points (one on each side of the endpoint) along the perimeter of the object near the spoke endpoint (preferably 5 pixels from the endpoint) are located and the angle formed between them and the endpoint is computed. This process is repeated using points successively further away (preferably 1 pixel from previously tested pixels) from the spoke endpoint as long as the angle continues to decrease. When the angle starts to increase, these points along the curve are fixed as the "beam endpoints." Two points (E and F) on the object are then identified S10F, as described in detail below, as a substitute for each initial spoke endpoint for respectively defining a second point for each "beam endpoint" between which a line defining the beam edges can be drawn. The two intersecting lines for each spoke are hereinafter referred to as a mated pair of beam edges.

To determine the other point of each beam, the curvature of the perimeter of the object in the vicinity of the spoke endpoint is examined and two points are selected, one on each side of the spoke endpoint where the curvature begins to significantly decrease relative to the curvature at the spoke endpoint, for example points G and H in FIG. 9 (S10G). This process is repeated for each spoke in the object S10H.

Once all of the beams in the current object have been processed, the search of the smoothed chromaticity bitmap continues for additional objects as described above S10I. If no additional suitable objects are found, the method continues with the next step.

Figure 10:
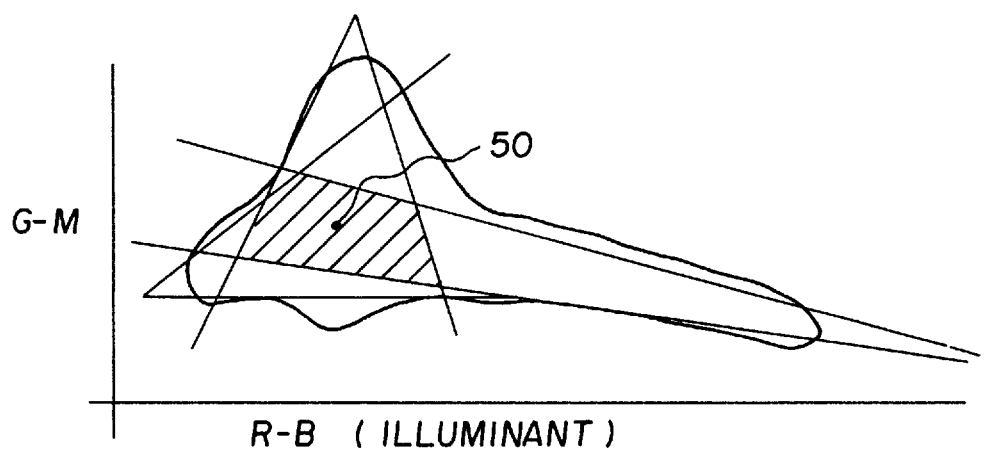
FIG. 10 is the chromaticity diagram of FIG. 4 illustrating a "maximum beam intersection set."

Referring to FIGS. 2 and 10, the next step is to project all of the beams found for all of the objects all the way across the entire smoothed chromaticity bitmap such that they intersect S12. Then the area bounded between the "maximum beam intersection set" is computed as follows. The entire chromaticity bitmap is again scanned raster fashion (again preferably starting at the lower-left corner) and the coordinates of each point are tested against every mated pair of beam edges to determine if it is between a mated pair of beam edges; that is, whether it is to the right of a left beam edge and to the left of a right beam edge (where left and right are relative to an observer positioned at the spoke endpoint facing toward the beam endpoints). This may be done using a standard algorithm for determining the relationship between a point and a straight line in two-dimensional space. A counter is incremented for every mated pair of beam edges between which a given point is disposed. If the count reaches a value equal to the number of total number of beams, that point is saved as a member of a "maximum beam intersection set."

If there aren't any points in the "maximum beam intersection set," the testing process is repeated, decrementing the intersection threshold by one each time until a non-zero intersection set is found. If an intersection is not located, the central point (point A of FIG. 7) is returned as the illuminant point.

This "maximum beam intersection set" thus forms a polygon describing the smallest region in which the most beams intersect. The final step in the method is to compute a measure of central tendency of this polygon S14. For example, the centroid of the polygon may be used. The coordinates of the computed central point 50 represent the chromaticity of the illuminant in T-space of the original color image.

The user may then either select another image S16 for repeating the above-described steps, or exit S18 the program.

The invention has been described with reference to a preferred embodiment. However, it will be appreciated that variations and modifications can be effected by a person of ordinary skill in the art without departing from the scope of the invention.

PARTS LIST 10 digital image capture device 20 scene 25 illuminant 30 image processor 40 color display device

I claim:

1. A method for determining the color of an illuminant of a scene, comprising the steps of:
   a) forming a color digital image of the scene;
   b) forming a chromaticity bitmap of the digital image;
   c) smoothing the chromaticity bitmap;
   d) identifying a plurality of spokes in the smoothed chromaticity bitmap and projecting a plurality of beams across the smoothed chromaticity bitmap, each beam encompassing one of the spokes;
   e) identifying the intersection of the beams; and
   f) determining the central tendency of the intersection to determine the color of the illuminant.

2. The method for determining the color of an illuminant of a scene claimed in claim 1, wherein the chromaticity bitmap in T space.

3. The method for determining the color of an illuminant of a scene claimed in claim 1, wherein the step of smoothing the chromaticity bitmap includes the steps of:
   a) blurring the bitmap to create a gray level image of the bitmap;
   b) thresholding the gray level image back to a binary image; and
   c) repeating the blurring and thresholding steps until the chromaticity bitmap is sufficiently smoothed.

4. The method for determining the color of an illuminant of a scene claimed in claim 1, wherein the step of identifying a plurality of spokes in the smoothed chromaticity bitmap and projecting a plurality of beams across the smoothed chromaticity bitmap includes the steps of:
   a) finding a pixel on the border of an object in the smoothed chromacity bitmap image;
   b) generating a chain code defining the outline of the object;
   c) for an object having a chain code greater than a predetermined length, selecting a point near the center of the object;
   d) generating a list of distances between the selected point and each point defined by following the chain code;
   e) finding the local maxima in the list, the local maxima representing the ends of the spokes on the object;
   f) retracing the chain code from each local maximum in both directions to a pair of points where the angle formed by the three points involved is no longer decreasing to fix a first pair of points on the beam;
   g) continuing along the chain code in both directions from each local maximum to a pair of points where the curvature significantly decreases to fix a second pair of points on the beam;
   h) projecting a pair of lines through each corresponding set of points determined in steps f and g across the bitmap to determine the beam; and
   i) repeating steps a) through h) for every object in the smoothed bitmap.

5. The method for determining the color of an illuminant of a scene claimed in claim 1, wherein the step of identifying the intersection of the beams includes the steps of:
   a) determining, for each point in the entire region occupied by the intersecting beams, for every pair of beam edges whether the point lies to the right of the left edge and to the left of the right edge; and
   b) incrementing a counter for each beam intersection found at that point; and
   c) setting a point of maximal intersection for those points whose counter reaches a value equal to the number of beams; and
   d) repeating steps a–c if the maximum intersection set is empty, decrementing the value of the count threshold used in step c by one until a non-empty intersection set is obtained; and
   e) treating the intersection set as a polygon.

6. The method for determining the color of an illuminant of a scene claimed in claim 5, wherein the step of determining the central tendency of the intersection comprises locating the center of the identified polygon.

* * * * *